(12) United States Patent
Desmouceaux et al.

(10) Patent No.: US 11,665,129 B2
(45) Date of Patent: May 30, 2023

(54) ADAPTIVE SOURCE ADDRESS REWRITE

(71) Applicant: Cisco Technology, Inc., San Jose, CA (US)

(72) Inventors: Yoann Desmouceaux, Paris (FR); Rucha Sanjay Vaidya, Mountain View, CA (US); Murali Muniraman, McKinney, TX (US); Pierre Pfister, Chalons-en-Champagne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/485,789

(22) Filed: Sep. 27, 2021

(65) Prior Publication Data
US 2022/0294758 A1 Sep. 15, 2022

Related U.S. Application Data

(60) Provisional application No. 63/159,291, filed on Mar. 10, 2021.

(51) Int. Cl.
*H04L 61/251* (2022.01)
*H04L 61/2557* (2022.01)
(Continued)

(52) U.S. Cl.
CPC ........ *H04L 61/251* (2013.01); *H04L 61/2557* (2013.01); *H04L 61/5061* (2022.05); *H04L 47/125* (2013.01); *H04L 2101/659* (2022.05)

(58) Field of Classification Search
CPC .............. H04L 61/251; H04L 61/5061; H04L 61/2557; H04L 2101/659; H04L 47/125
See application file for complete search history.

(56) References Cited

U.S. PATENT DOCUMENTS 6,965,599 B1   11/2005  Sakurai et al.
2012/0099592 A1  4/2012  Ludwig
(Continued)

FOREIGN PATENT DOCUMENTS

FR       3022722 A1    12/2015
WO   WO-2009015727 A1 *  2/2009  ............. H04L 69/04

OTHER PUBLICATIONS

Linkova (RFC 8475, Using Conditional Router Advertisements for Enterprise Multihoming, Oct. 2018) (Year: 2018).*

(Continued)

*Primary Examiner* — Zhensheng Zhang
(74) *Attorney, Agent, or Firm* — Baker Botts L.L.P.

(57) ABSTRACT

According to certain embodiments, a system comprises one or more processors and one or more computer-readable non-transitory storage media comprising instructions that, when executed by the one or more processors, cause one or more components of the system to perform operations. The operations comprise receiving a packet comprising a source address; selecting an uplink for the packet, the uplink selected from a plurality of uplinks based on an uplink selection policy; determining whether the source address is valid on the selected uplink; determining whether to keep or re-write the source address based on whether the source address is valid on the selected uplink; keeping the source address when the source address is valid on the selected uplink or re-writing the source address when the source address is not valid on the selected uplink; and sending the packet to the selected uplink.

20 Claims, 5 Drawing Sheets

(51) Int. Cl.
  *H04L 61/5061*   (2022.01)
  *H04L 47/125*   (2022.01)
  *H04L 101/659*   (2022.01)

(56) References Cited

U.S. PATENT DOCUMENTS

| | | |
|---|---|---|
| 2015/0244607 A1 | 8/2015 | Han |
| 2018/0295549 A1 | 10/2018 | Perras et al. |
| 2019/0104458 A1 | 4/2019 | Svennebring et al. |
| 2019/0281611 A1 | 9/2019 | Bao et al. |
| 2021/0168125 A1 | 6/2021 | Vemulpali |

OTHER PUBLICATIONS

SD-WAN and IPv6 for Effective IoT Deployment, Alibaba Clouder Aug. 8, 2018, https://www.alibabacloud.com/blog/593888.

Internet Engineering Task Force (IETF), Request for Comments: 6296, Category: Experimental, ISSN: 2070-1721, M. Wasserman, Painless Security, F. Baker, Cisco Systems, Jun. 2011, IPv6-to-IPv6 Network Prefix Translation, https://datatracker.ietf.org/doc/html/rfc6296.

Internet Engineering Task Force (IETF) Request for Comments: 7157 Category: Informational ISSN: 2070-1721 O. Troan, Ed., Cisco, D. Miles, Google Fiber, S. Matsushima, Softbank Telecom, T. Okimoto, NTT West, D. Wing, Cisco, Mar. 2014, IPv6 Multihoming without Network Address Translation, https://datatracker.ietf.org/doc/html/rfc7157.

Internet Engineering Task Force (IETF), Request for Comments: 7217, Category: Standards Track, ISSN: 2070-1721, F. Gont, SI6 Networks / UTN-FRH, Apr. 2014, A Method for Generating Semantically Opaque Interface Identifiers with IPv6 Stateless Address Autoconfiguration (SLAAC), https://datatracker.ietf.org/doc/html/rfc7217.

Internet Engineering Task Force (IETF), Request for Comments: 7788, Category: Standards Track, ISSN: 2070-1721, M. Stenberg, S. Barth, Independent, P. Pfister, Cisco Systems, Apr. 2016, Home Networking Control Protocol, https://datatracker.ietf.org/doc/html/rfc7788.

Internet Engineering Task Force (IETF), Request for Comments: 8801, Category: Standards Track, ISSN: 2070-1721, P. Pfister, É. Vyncke, Cisco, T. Pauly, Apple Inc., D. Schinazi, Google LLC, W. Shao, Cisco, Jul. 2020, Discovering Provisioning Domain Names and Data, https://datatracker.ietf.org/doc/html/rfc8801.

Internet Engineering Task Force (IETF), Request for Comments: 8475, Category: Informational, ISSN: 2070-1721, J. Linkova, Google, M. Stucchi, Ripe NCC, Oct. 2018, Using Conditional Router Advertisements for Enterprise Multihoming, https://datatracker.ietf.org/doc/html/rfc8475.

Internet Engineering Task Force (IETF), Request for Comments: 8678, Category: Informational, ISSN: 2070-1721, F. Baker, C. Bowers, Juniper Networks, J. Linkova, Google, Dec. 2019, Enterprise Multihoming Using Provider-Assigned IPv6 Addresses without Network Prefix Translation: Requirements and Solutions, https://datatracker.ietf.org/doc/html/rfc8678.

3GPP TSG SA WG2 Architecutre—S2#SAEAdHoc S2H060369, Siemens, "Solution Alternative for Key Issue IP Connectivity with Multiple PDNs", dated Apr. 3-6, 2006, 4 pages.

C. Huitema, Microsoft Corporation; C. Bao, CERNET Center/Tsinghua University; M. Bagnulo, UC3M; M. Boucadair, France Telecom; X. Li, CERNET Center/Tsinghua University; Network Working Group, Internet-Draft, "IPv6 Addressing of IPv4/IPv6 Translators draft-ietf-behave-translator-addressing-00.txt", dated Aug. 21, 2009, 24 pages.

3GPP TSG-SA WG1 Meeting #48 S1-094237, Nokia Siemens Networks, Nokia, "Considerations on requirements of SIPTO for macro networks", dated Nov. 16-20, 2009, 4 pages.

C. Bao CERNET Center/Tsinghua University; C. Huitema, Microsoft Corporation; M. Bagnulo UC3M; M. Boucadair, France Telecom; X. Li, CERNET Center/Tsinghua University; Internet Engineering Task Force (IETF) ISSN: 2070-1721, "IPv6 Addressing of IPv4/IPv6 Translators," server date Oct. 29, 2010; downloaded by EPO on Oct. 30, 2010 dated Oct. 2010, 18 pages.

M. Wasserman, Painless Security; F. Baker Cisco Systems; Internet Engineering Task Force (IETF); "IPv6-to-IPv6 Network Prefix Translation", server date Jun. 29, 2011; downloaded by EP on Jul. 14, 2011, dated Jun. 2011, 32 pages.

PCT Search Report and Written Opinion corresponding to PCT No. PCT/US2022/070778, dated May 20, 2022, 15 pages.

\* cited by examiner

ADAPTIVE SOURCE ADDRESS REWRITE

RELATED APPLICATIONS

This application claims priority to U.S. Provisional Patent Application Ser. No. 63/159,291, filed on Mar. 10, 2021, which is hereby incorporated by reference in its entirety.

TECHNICAL FIELD

In general, certain embodiments relate to an addressing approach for a packet communicated via a network. Certain embodiments determine whether to rewrite a source address of the packet. Certain embodiments provide a deterministic and adaptive source address rewrite approach for Software-Defined Wide Area Network (SD-WAN) Internet Protocol version 6 (IPv6) networks.

BACKGROUND

A network address may identify a node on a network. For example, an Internet Protocol (IP) address may identify a node on a network that uses the Internet Protocol for communication. Examples of IP address formats include IP version 4 (IPv4) and IP version 6 (IPv6). IPv4 defines an IP address as a 32-bit number. IPv6 was introduced in response to the growth of the Internet and the depletion of available IPv4 addresses. In particular, IPv6 uses 128 bits for the IP address and therefore supports a larger address pool than IPv4. A packet communicated via the network may include a source address and a destination address. The source address indicates the sender of the packet. This address may be changed in transit, for example, by a network address translation (NAT) device. The destination address indicates the receiver of the packet. As with the source address, this may be changed in transit, for example, by a NAT device.

DESCRIPTION OF EXAMPLE EMBODIMENTS

Overview

Figure 1:
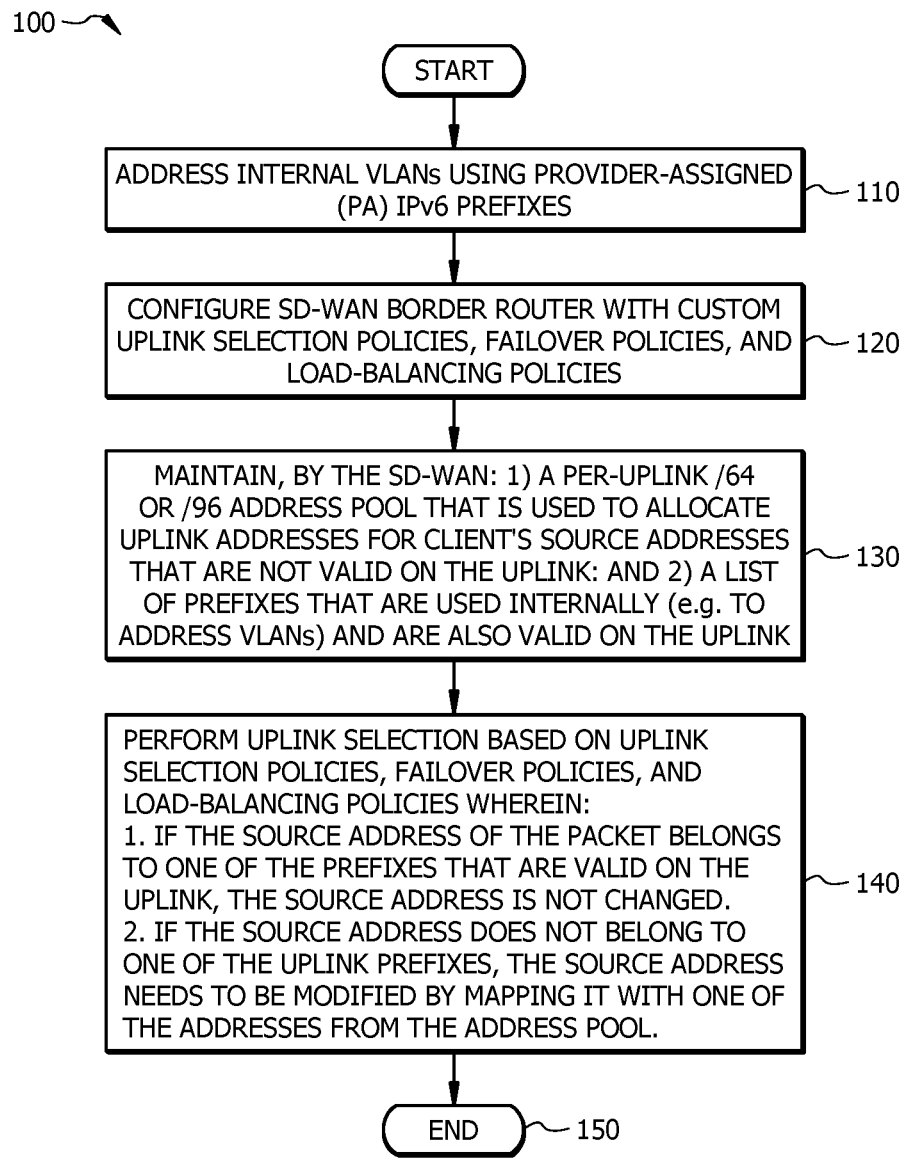
FIG. 1 illustrates an example of a method for a deterministic and adaptive source address rewrite for SD-WAN IPv6 networks, in accordance with certain embodiments.

According to certain embodiments, a system comprises one or more processors and one or more computer-readable non-transitory storage media comprising instructions that, when executed by the one or more processors, cause one or more components of the system to perform operations. The operations comprise receiving a packet comprising a source address; selecting an uplink for the packet, the uplink selected from a plurality of uplinks based on an uplink selection policy; determining whether the source address is valid on the selected uplink; determining whether to keep or re-write the source address based on whether the source address is valid on the selected uplink; keeping the source address when the source address is valid on the selected uplink or re-writing the source address when the source address is not valid on the selected uplink; and sending the packet to the selected uplink.

According to another embodiment, a method comprises receiving a packet comprising a source address; selecting an uplink for the packet, the uplink selected from a plurality of uplinks based on an uplink selection policy; determining whether the source address is valid on the selected uplink; determining whether to keep or re-write the source address based on whether the source address is valid on the selected uplink; keeping the source address when the source address is valid on the selected uplink or re-writing the source address when the source address is not valid on the selected uplink; and sending the packet to the selected uplink.

According to yet another embodiment, one or more computer-readable non-transitory storage media may embody instructions that, when executed by a processor, cause the performance of operations. The operations comprise receiving a packet comprising a source address; selecting an uplink for the packet, the uplink selected from a plurality of uplinks based on an uplink selection policy; determining whether the source address is valid on the selected uplink; determining whether to keep or re-write the source address based on whether the source address is valid on the selected uplink; keeping the source address when the source address is valid on the selected uplink or re-writing the source address when the source address is not valid on the selected uplink; and sending the packet to the selected uplink.

Technical advantages of certain embodiments of this disclosure may include one or more of the following. As an example, certain embodiments facilitate sending a packet without re-writing the address in certain circumstances (e.g., to preserve end-to-end connectivity and/or simplify address management), and sending the packet with re-writing the address in other circumstances (e.g., to allow an uplink selection policy to be applied). As another example, certain embodiments may enable multi-homed IPv6 networks to implement advanced SD-WAN uplink selection policies, while also allowing provider-assigned IPv6 prefixes to be used when numbering internal virtual local area network (VLANs) (instead of unique local address (ULA)-only addressing). When the internal client address is valid on an uplink, the packet may be left unmodified. Otherwise, a mapped uplink address may be selected from a /64 or /96 address pool. The use of consistent hashing in this mapping process allows, in some cases (e.g., when a /64 is used), the mapping to be stateless. In other cases (e.g., when using a /96), the mapping may be stored in a table, but even a mapping generated without relying on a table lookup has very high likelihood of yielding the correct result. Certain embodiments provide an efficient address mapping algorithm to be used when the ISP does not provide sufficient addressing space for the internal enterprise network.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Network address translation (NAT) is a method of remapping an IP address space into another by modifying network address information in the IP header of packets while they are in transit across a traffic routing device. The technique was originally used to simplify IP address management by avoiding the need to assign a new address to every host when a network was moved, or when the upstream Internet service provider was replaced, but could not route the networks address space. Later, it was used as a tool in conserving global address space in the face of Internet Protocol version 4 (IPv4) address exhaustion. This came at the cost of breaking the end-to-end IP paradigm (i.e., keeping IP packets unchanged from a source to a destination) and creating additional complexity at the application layer, as well as within the NATs themselves.

With IPv6, having essentially an infinite addressing space, came the opportunity to establish the end-to-end internet. Instead of receiving a single address from the Internet Service Provider (ISP), connected networks receive /60, /56, or even larger prefixes, allowing them to number the entirety of their network with addresses that are valid globally.

When an enterprise or home network is multi-homed, the current Internet Engineering Task Force (IETF) standards (RFC7157, RFC8475, RFC7788, RFC8801) specify that virtual local area networks (VLANs) should be addressed with possibly multiple global prefixes that come from the different uplinks. As a result, in the case of two uplinks, a VLAN may be configured with three IPv6 prefixes: one for each uplink-delegated prefix and one unique local address (ULA) prefix that also provides a more stable address. IETF then explains that a packet should be routed to an uplink depending on its source address. Specifically, if the source address is from the prefix from ISP1, the packet should be sent on the ISP1 uplink. If the source address is from the prefix from ISP2, the packet should be sent on ISP2 uplink. Selecting the right uplink depending on the source address is of paramount importance, as the network ingress filtering (e.g., BCP38) would mandate the ISP to drop the packet otherwise. Nevertheless, the IETF approach fails to address the at least following multiple scenarios: 1) when the uplink that would be selected based on the source address is down, or does not appear to provide internet access; 2) when an SD-WAN policy has been configured to force a particular type of traffic (e.g. based on destination address) to be forwarded to another uplink; 3) when an SD-WAN policy has been configured to perform load-balancing between multiple different uplinks; and 4) when the source address is in the ULA prefix and is therefore not valid on the uplink. In the foregoing cases, the source address must be modified so that the packet may be transmitted on a different uplink.

Existing IETF standards (e.g., RFC7157, RFC8475, RFC7788, RFC8801) specify that internal VLANs should be addressed with provider-assigned prefixes, and that multiple prefixes should be assigned to each VLAN in the case of multiple independent uplinks. Conventionally, source-address-dependent-routing (SADR) is used to select the proper uplink for packets destined to the internet. The limitations of existing standards include their reliance on private addressing and network prefix translation (which ignores the benefits of using provider-assigned addresses directly) and/or reliance on clients to choose the appropriate source address and SADR to select the right exit (which does not support SD-WAN policies).

The present disclosure is directed to a mechanism that enables multi-homed IPv6 networks to implement advanced SD-WAN uplink selection policies, while also allowing provider-assigned IPv6 prefixes to be used when numbering internal VLANs (rather than being limited to ULA addressing). When the internal client address is valid on an uplink, the packet is left unmodified. Otherwise, a mapped uplink address is selected from a /64 or /96 address pool. The use of consistent hashing in this mapping process allows, in some cases (e.g. when a /64 is used), the mapping to be stateless. In other cases (e.g. when using a /96), the mapping is stored in a table, but a mapping generated after an entry eviction has very high likelihood of yielding the same result. Finally, embodiments of the present disclosure also provide an efficient address mapping algorithm to be used when the ISP does not provide sufficient addressing space for the internal enterprise network.

Certain technical advantages of the mechanisms described in the present disclosure include the ability to support multiple uplinks while enabling the use of provider-assigned prefixes to address VLANs, to ensure end-to-end connectivity without address rewrite whenever possible, and to not require addressing the internal network with only ULAs.

FIG. 1 illustrates an example method 100 for deterministic and adaptive source address rewrite for SD-WAN IPv6 networks, in accordance with the present disclosure. Method 100 begins at step 110, where internal VLANs are addressed using provider-assigned (PA) IPv6 prefixes (i.e., delegated prefixes). A VLAN may be configured with as many prefixes as there are uplinks. As specified in RFC8475, prefixes may be added, removed, and/or deprecated dynamically based on the availability of the uplinks. A ULA prefix may be used in addition to PA prefixes in order to ensure stable internal connectivity.

At step 120, the SD-WAN border router is configured with custom uplink selection policies, failover policies and load-balancing policies. In an embodiment, these policies may be based on advanced Layer 4 (L4) and/or Layer 7 (L7) rules, which may include Domain Name System (DNS) names, port ranges, etc. As a result, the uplink selected by a packet is not dependent only on its source address. At step 130, for each uplink, the SD-WAN maintains (i.e., is configured with or dynamically generates) the following: 1) a per-uplink /64 or /96 address pool that is used to allocate uplink addresses for the client's source addresses that are not valid on the uplink; and 2) a list of prefixes that are used internally (e.g., to address VLANs) and are also valid on the uplink because they are part of the PA prefixes from this uplink. At step 140, when a new flow needs to be forwarded to one of the uplinks, uplink selection is performed based on uplink selection policies, failover policies, and load-balancing policies. If the source address of the packet belongs to one of the prefixes that are valid on the uplink, the source address is not changed. If the source address does not belong to one of the uplink prefixes, the source address needs to be modified by mapping it with one of the addresses from the address pool, as specified below.

In order to map internal client addresses that are not valid on an uplink with external addresses from the uplink address pool, the client address is hashed to generate an integer that is 64 bits long. In an embodiment, this may be done by concatenating the results of two cyclic redundancy check (crc32) hashing functions using different polynomials. However, it is to be understood that any hashing scheme may be used. In an embodiment, the resulting integer is concatenated to the /64 prefix from the address pool. In another embodiment the resulting integer is concatenated to the /96 prefix, in which case only 32 bits of hashing are sufficient.

Based on the foregoing steps of hashing and generating an integer, multiple scenarios may be considered. When using a /64 address pool, the likelihood of a collision is considered negligible (i.e., one every $2^{32}$ addresses, when using a good hashing function). In this case, the mapping may be used without maintaining state. When using a /96 address pool (i.e., corresponding to one every 65 k addresses, which is not a sufficiently low collision probability) or whenever the hashing function does not otherwise provide sufficiently good collision avoidance properties, the mapping is stored in a table.

In the event of a collision, a second independent hash is used to select another uplink address candidate. The probability of two consecutive hashing collision becomes extremely low (i.e., one every $2^{32}$). Thus, there is no need for any exhaustive address search or available address pool maintenance. When a mapping table is maintained, a lookup is performed before computing the hashing in order to check if a mapping exists.

In an embodiment, in order to avoid recomputing L4 checksums, "checksum-neutral" addresses may be generated by modifying 16 bits at a fixed offset of the resulting address, such that the (one-complement) sum of the new address is identical to that of the old address. The value of these 16 bits may be retrieved by subtracting the external address (initially filled with zeros for the unknown 16 bits) from the internal address. For example, a /64 address pool may be used with a 48-bit hash function and 16 bits for checksum neutralization, a /80 address pool with a 32-bit hash function and 16 bits for checksum neutralization, or a /96 address pool with a 16-bit hash function and 16 bits for checksum neutralization (in the latter case, the probability of collisions is high). Method 100 ends at step 150.

Because some internet service providers (e.g., most cellular providers) do not support delegating prefixes, and instead, as per the IPv6 standard, advertise an IPv6 /64 on the uplink, the connected router is free to allocate one or multiple addresses. To address such scenarios, in an embodiment, private addressing (e.g., a unique local address (ULA)) may be used for internal addressing. As a result, the list of valid prefixes on the uplink is empty, but the same mapping algorithm may still be used to provide external connectivity. For example, a /96 prefix may be randomly selected from the uplink assigned /64. The SD-WAN appliance selects a /96 prefix that would not overlap with the gateway's address.

In certain embodiments, the SD-WAN appliance "defends" all the addresses from that /96 prefix on the uplink, which means that if any node on the uplink performs Address Resolution or Duplicate Address Detection for an address in this /96 prefix, the SD-WAN appliance replies with its hardware address. This allows any of the addresses in the /96 prefix to be used to create mappings for internal clients. The SD-WAN appliance may defend the addresses from the /96 prefix on the uplink in cases where the VLANs use internal (e.g., ULA) addressing and/or in cases where the VLANs do not use internal addressing. In an embodiment, the same "checksum-neutral" variant may be used.

In another embodiment, when the ISP only provides a /64 prefix, an Neighbor Discovery proxy (ND-proxy) may be used. This is typically used by networks having a single VLAN, but using a single /64 prefix in a multi-VLAN network (i.e., most enterprise networks) may not be practical in many applications.

While the present disclosure describes the use of the crc32c hashing function (available in Intel and ARM hardware) for the second independent hash, which is needed when there is a collision, a second crc32c function may be modified by first mixing the source address bits together. Thus, when using a /96 prefix, stateful mappings are still maintained, but the table is small since only one entry is necessary per internal client address. Mapping lifetime is managed using an "last recently used" (LRU) based on the ordered hash-table, where the entries are refreshed when a packet is seen for a given client address. This allows for long-lived entries. In the scenario of an evicted entry, the consistent hashing based approach ensures that, unless there is a collision, the same uplink address is selected for the same internal address. Inbound traffic may also be supported by using a reverse mapping table. When a new flow arrives from an uplink, the packet is left unmodified whenever the destination address of that packet is in the valid prefix list. Otherwise, a reverse lookup is performed to determine the client address associated with this uplink address. If an internal address is found, it is used to replace the destination address of the packet.

Figure 2:
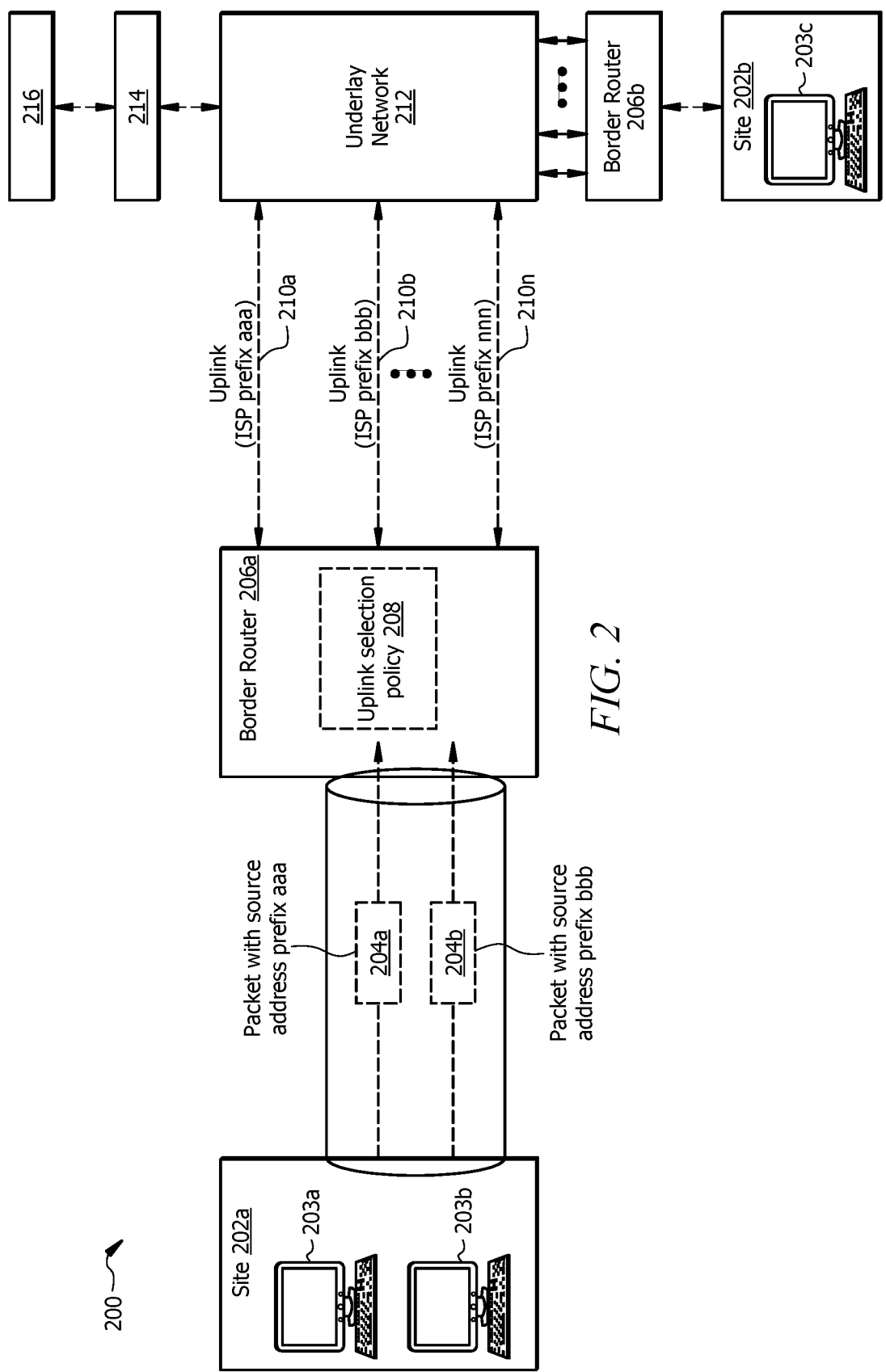
FIG. 2 illustrates an example of an SD-WAN, in accordance with certain embodiments.

FIG. 2 illustrates an example architecture of a network 200. In particular embodiments, network 200 may comprise an SD-WAN, which is a virtual overlay network based on tunnels that carry traffic between a plurality of sites 202 over one or more underlay networks 212. The example illustrated in FIG. 2 shows two sites: a first site 202a and a second site 202b. Each site may connect to the network 200 via one or more border routers 206. For example, the first site 202a connects to the network 200 through a first border router 206a, and the second site 202b connects to the network 200 through a second border router 206b. A site 202 connected to the network 200 may have a data plane connection to each of the other sites 202, for example, through Internet Protocol Security (IPSec) tunnels. The border routers 206a and 206b may have a data plane connection over the underlay network 212. The underlay network 212 may comprise Multiprotocol Label Switching (MPLS), Internet, and/or cellular networks, for example.

In certain embodiments, an SD-WAN control plane may comprise a controller 214 that may maintain a centralized routing table and the routing policies to program the forwarding behavior of the data plane. The controller 214 may maintain direct control plane connection to each border router 206. The controller 214 may provision, maintain, and secure the entire overlay network. The network 200 may also comprise management/orchestration plane 216. Although this disclosure describes an SD-WAN network in a particular manner, this disclosure contemplates an SD-WAN network in any suitable manner. Additionally, although this disclosure describes an SD-WAN, this disclosure contemplates any other suitable network.

In certain embodiments, a site 202 may comprise a VLAN. One or more devices 203 may be associated with each VLAN. FIG. 2 illustrates an example where a first device 203a and a second device 203b may each be associated with a first VLAN of the first site 202a, and a third device 203c may be associated with a second VLAN of the second site 202b. In an embodiment, the first VLAN transmits a first packet 204a from the first device 203a to the first border router 206a. The first packet 204a comprises a source address with a first prefix, illustrated as "aaa," where aaa may represent a numerical value, such as a prefix of an IP address.

The first border router 206a may receive the first packet 204a and may select an uplink 210 from a plurality of uplinks 210a-n for transmitting the first packet 204a. As an example, the plurality of uplinks 210a-n may include a first uplink 210a associated with a source address prefix from a first ISP1 (such as prefix "aaa"), a second uplink 210b associated with a source address prefix from a second ISP2 (such as prefix "bbb"), . . . and an $n^{th}$ uplink 210n associated with a source address prefix from an $n^{th}$ ISP (such as prefix "nnn"). The first border router 206a may select the uplink 210 based on an uplink selection policy 208.

Uplink selection policy 208 may generally refer to one or more rules, policies, etc. suitable for use in selection of an uplink. In certain embodiments, an uplink selection policy 208 may comprise a plurality of rules or portions, and the rules or portions may be integrated into the same policy or distributed among multiple policies. As an example, in certain embodiments, an uplink selection policy 208 may comprise a failover policy, a load-balancing policy, a routing policy, a custom policy, other suitable policy, or one or more rules or portions from any one or more of the preceding types of policies. In certain embodiments, uplink selection policy 208 may obtain information from another policy (such as a failover policy or load-balancing policy) and may use the information to select an uplink. In certain embodiments, uplink selection policy 208 may provide a portion of a network policy, such as an SD-WAN policy. Thus, in certain embodiments, uplink selection policy 208 may be included in a network policy or set of network policies.

In certain embodiments, the uplink selection policy 208 may indicate to select the uplink 210 that corresponds to packet 204*a*'s source address prefix unless certain conditions apply. Examples of such conditions may include 1) when the uplink 210 that would be selected based on the source address is down, or does not appear to provide internet access; 2) when the uplink selection policy 208 has been configured to force a particular type of traffic (e.g., based on destination address) to be forwarded to another uplink 210; 3) when the uplink selection policy 208 has been configured to perform load-balancing between multiple different uplinks 210; and 4) when the source address is in the ULA prefix and is therefore not valid on the uplink 210.

Continuing with the example, the first border router 206*a* may select the first uplink 210*a* for the first packet 204*a* based on determining that the prefix "aaa" in the source address of the first packet 204*a* corresponds to the prefix "aaa" of the first ISP1 associated with the first uplink 210*a* (assuming that no condition exists for which the uplink selection policy 208 indicates to select a different uplink 210). The first border router 206*a* may then determine to keep or re-write the source address of the first packet 204*a* based on whether the source address is valid on the selected uplink 210*a*. In the example, the first border router 206*a* may determine that the source address is valid and may keep the source address because the prefix "aaa" of the source address in the first packet 204*a* matches the prefix "aaa" associated with the selected uplink 210*a*, allowing for end-to-end connectivity. The first border router 206*a* may then send the first packet 204*a* to the underlay network 212 via the selected uplink 210*a*. Network 200 may then route the first packet 204*a* to its destination.

In an embodiment, the first VLAN transmits a second packet 204*b*, for example, from the second device 203*b* to the first border router 206*a*. The second packet 204*b* comprises a source address with a second prefix, illustrated as "bbb," where bbb may represent a numerical value, such as a prefix of an IP address. The first border router 206*a* may receive the second packet 204*b* and may select an uplink 210 from the plurality of uplinks 210*a*-*n* based on the uplink selection policy 208. As an example, suppose that the prefix "bbb" in the source address of the second packet 204*b* corresponds to prefix "bbb" of the second ISP2 associated with the second uplink 210*b*. Further suppose that the uplink selection policy 208 indicates to select an uplink 210 other than the second uplink 210*b* (such as the first uplink 210*a*), for example, if the second uplink 210*b* is down, does not appear to support internet access, requires load-balancing, or has not been assigned/configured for a particular type of traffic carried by the second packet 204*b*. The first border router 206*a* may then determine to keep or re-write the source address of the second packet 204*b* based on whether the source address is valid on the first uplink 210*a* (the selected uplink). In the example, the first border router 206*a* may determine that the source address is not valid and may re-write the source address because the prefix "bbb" of the source address in the first packet 204*a* does not correspond to the prefix "aaa" associated with the selected uplink 210*a*. The first border router 206*a* may then send the first packet 204*a* to the underlay network 212 via the selected uplink 210*a*. Network 200 may then route the first packet 204*a* to its destination.

Figure 3:
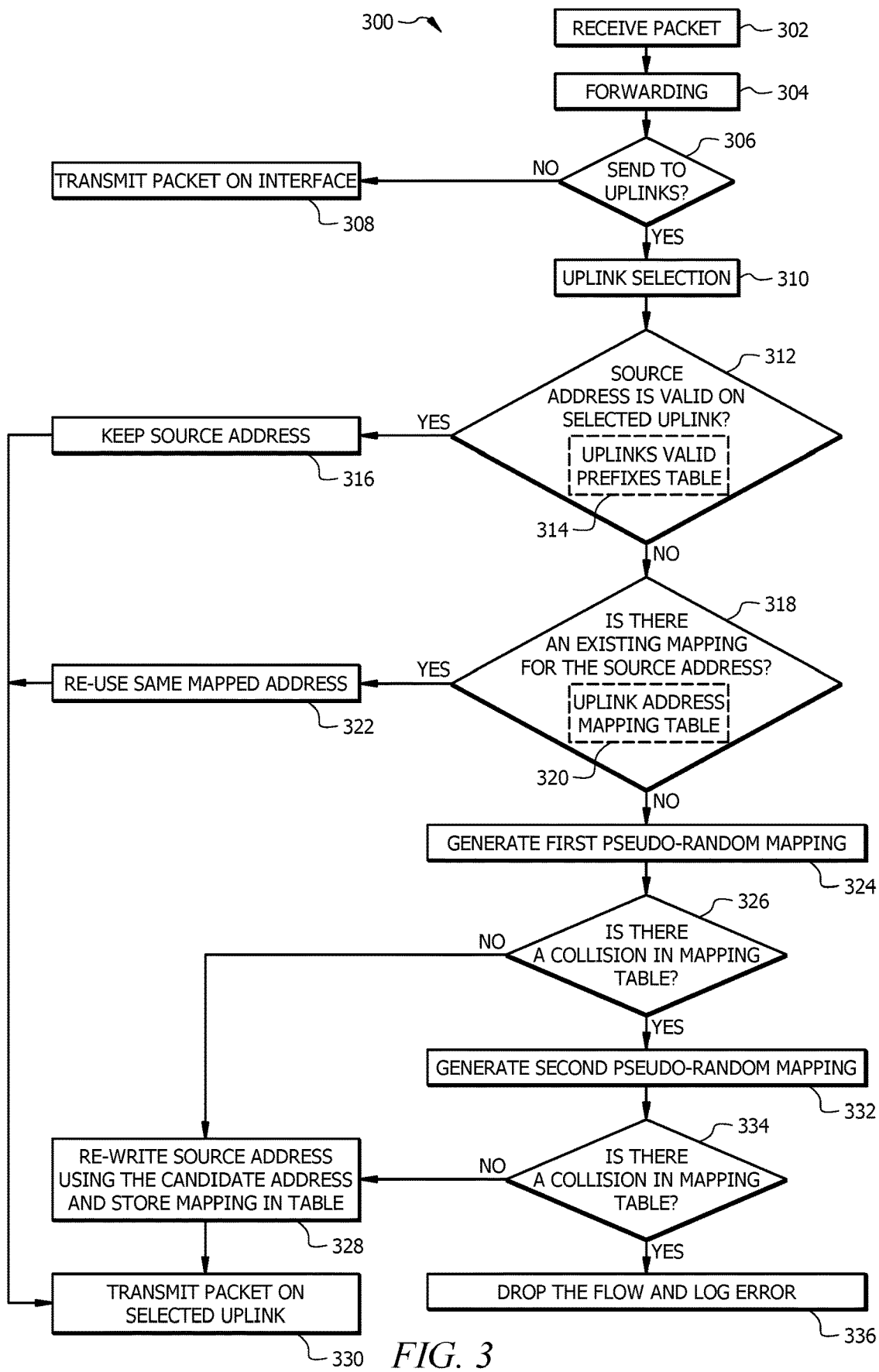
FIG. 3 illustrates an example of a method for sending a packet, in accordance with certain embodiments.
Figure 4:
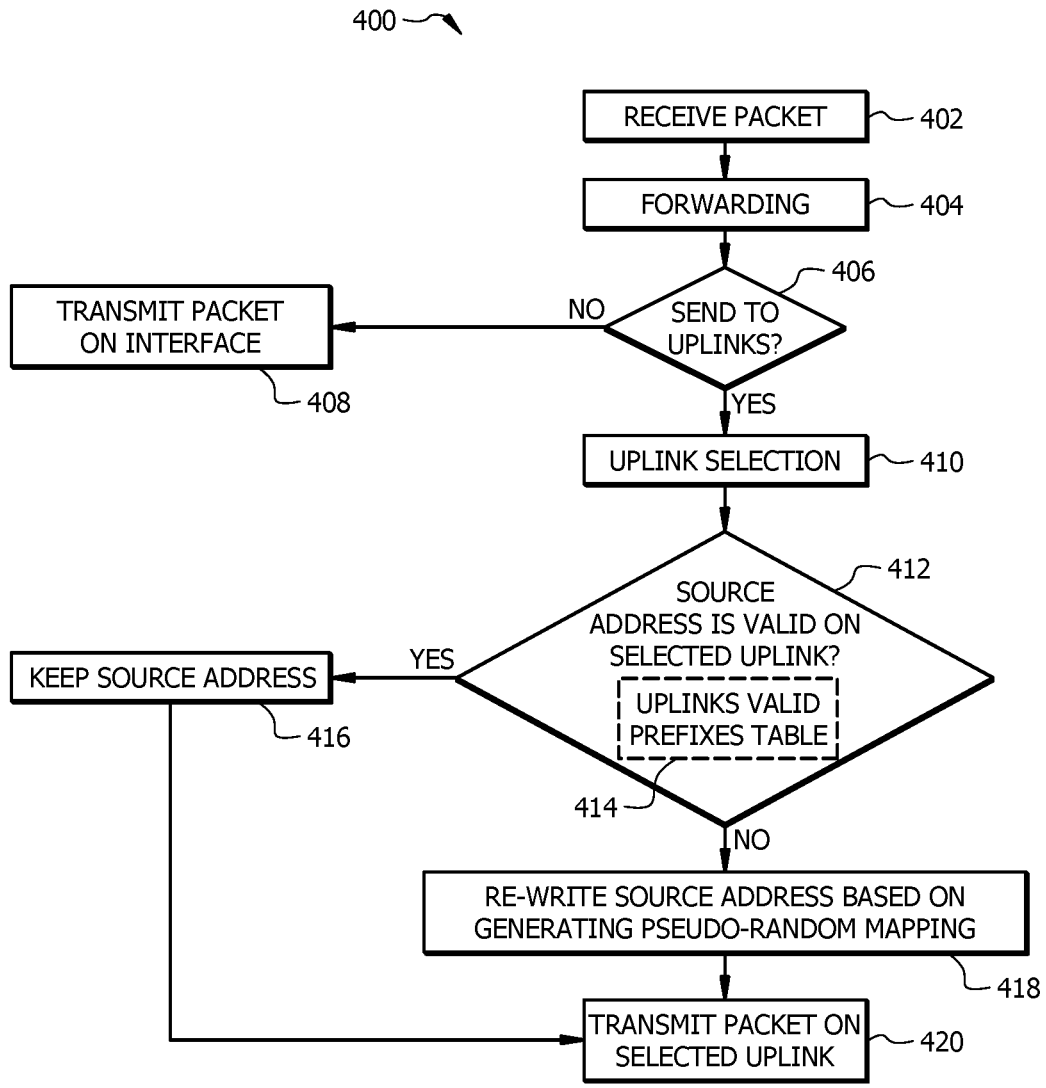
FIG. 4 illustrates an example of a method for sending a packet, in accordance with certain embodiments.

FIGS. 3 and 4 illustrate examples of methods 300 and 400, respectively, for sending a packet. While the details of FIGS. 3 and 4 are described separately below, these figures include some similar features. In general, each method may include receiving a packet comprising a source address (e.g., step 302 or step 402); selecting an uplink for the packet (e.g., step 310 or step 410), the uplink is selected from a plurality of uplinks based on an uplink selection policy (such as uplink selection policy 208 described with respect to FIG. 2); determining whether the source address is valid on the selected uplink (e.g., step 312 or step 412); determining whether to keep or re-write the source address based on whether the source address is valid on the selected uplink; keeping the source address when the source address is valid on the selected uplink (e.g., step 316 or step 416) or re-writing the source address when the source address is not valid on the selected uplink (e.g., step 322 or step 328 or step 418); and sending the packet to the selected uplink (e.g., step 330 or step 420).

In response to determining to re-write the source address (e.g., in response to the determining in step 312/412 that the source address received in step 302/402 is not valid on the uplink selected in step 310/410), a new address may be selected from an address pool based at least in part on a stateful function (an example of which is further described with respect to FIG. 3) or a stateless function (an example of which is further described with respect to FIG. 4). Certain embodiments select a stateful function or a stateless function based on a prefix length for the source address. As an example, a stateful function may be used when the pool is a /96 (or /64 with checksum neutral 16 bits), and a stateless function may be used when the pool is /64. For embodiments that use checksum-neutral mappings to improve performances, instead of using the hash function to generate the full address, certain embodiments change a certain number of bits (such as 16 bits) so that re-writing the source address does not require doing a checksum.

In certain embodiments determining whether the source address is valid on the selected uplink (e.g., step 312 or step 412) is based on whether a prefix of the source address corresponds to a prefix associated with the selected uplink. FIG. 1 describes an example where the prefix "aaa" in the source address of the first packet 204*a* corresponds to the prefix "aaa" associated with the selected uplink (the first uplink 210*a*). FIG. 1 describes another example where the prefix "bbb" in the source address of the second packet 204*b* does not correspond to the prefix "aaa" associated with the selected uplink (the first uplink 210*a*). Certain embodiments determine the prefix associated with a selected uplink based on information received from an ISP. The information may be received dynamically. Certain embodiments determine the prefix associated with a selected uplink based on information received statically, such as via a website.

In certain embodiments, the uplink selection policy (e.g., the uplink selection policy used in step 310 or step 410, such as uplink selection policy 208) indicates to select a first uplink for which the source address is valid unless a condition occurs indicating to select a second uplink for which the source address is not valid. In certain embodiments, the uplink selection policy comprises one or more of the following conditions for selecting the second uplink: the first uplink is down; the first uplink does not appear to provide network access; the packet comprises a type of traffic configured to be sent via the second uplink; load-balancing indicates to send the packet via the second uplink; the source address is in a unique local address (ULA) prefix that is not valid on the first uplink.

In certain embodiments, in response to determining to re-write the source address, method 300 or 400 selects a new address from an address pool based at least in part on a hash function, examples of which are described above with respect to FIG. 1. Using hash-based address selection may improve address mapping stability compared to other options for address selection. As an example, selecting an address from an address pool based on a hash may provide certain advantages compared to methods in which a NAT uses a first-come-first-serve (FCFS) technique to allocate the uplink address.

As a first example, the FCFS technique comes at the cost of maintaining more per-flow state. The memory used for flow tables in hardware (e.g., ternary content-addressable memory, TCAM) can be expensive and can drive costs up (or limit the table size to use less memory). In software, memory is cheap, but central processing unit (CPU) layer 2 (L2)-layer 3 (L3) cache is not, and this often limits the flow table size before performance degradation is observed. Certain embodiments of the present disclosure may use a hash technique as an alternative to the FCFS technique, which in IPv6 may allow a whole /64 to be allocated for the sole purpose of address rewrite. This allows the forward mapping to be stateless, reducing costs and improving performance. As a second example, the FCFS technique can remap a given internal address with a different external address in case of table overflow or when a client is inactive for a long time. This lack of stability can cause connections to be lost. Certain embodiments of the present disclosure may use a hash technique to increase stability. For example, when a /96 is used, the use of hashing may ensure that a given source address almost always (~1 in 65 k chances) maps with the external address, even if the device appears offline for a long time. As a third example, the FCFS tends to be more predictable because the address allocation follows a deterministic (or pseudo-random) sequence. This makes address scanning easier. By contrast, the hash technique used by embodiments of the present disclosure provides randomness to allocation of the source address (e.g., using Stateless Address Autoconfiguration, SLAAC, IPv6 addresses can be randomly generated) to generate unpredictable addresses. This may help to increase the security of the IP address.

In certain embodiments, method 300 or method 400 further comprises receiving a list of prefixes from a service provider (e.g., an ISP) associated with at least one of the plurality of uplinks and reserving a portion of the prefixes for re-writing addresses. Thus, a portion of the prefixes may be reserved as a mapping allocation space. The rest of the prefixes received from the service provider may be used to address the network. As an example, suppose the service provider provides a list of prefixes comprising a first prefix, a second prefix, a third prefix, . . . and an Nth prefix. Certain embodiments may reserve a portion of the prefixes (such as the first prefix and the second prefix) as a mapping allocation space and may use the rest of the prefixes (such as the third prefix through the Nth prefix) to address the network.

Certain embodiments may allow for defending addresses. For example, even if an address is not currently being used, if a collision is detected, a message may be sent indicating that the SD-WAN owns the address.

Certain embodiments allow for using internal (private) IP addresses in the event that an ISP has not allocated a sufficient number of global IP addresses to support the private network. When receiving a packet with an internal source address, an uplink may be selected based on the uplink selection policy, and the source address may be re-written, for example, based on a global address or a hybrid global-plus-private address. A new mapping may be generated (or, in the stateless case, a previous mapping may be used if the previous mapping exists). As an example, suppose there are 3 VLANs (v1, v2, v3). Further suppose that ISP A has only allocated two /64 prefixes, p1 and p2, which are assigned to v1 and v2, respectively. Further suppose that ISP B has only allocated two /64 prefixes, q1 and q2, which are assigned to v1 and v2, respectively. Then, the device may assign a private (ULA) prefix u1 to v3. When the uplink is selected, methods analogous to those described elsewhere in this disclosure may be used. Certain embodiments rewrite the source address either (i) if it belongs to a public prefix for ISP A (e.g., p1, p2) but policy dictates that it shall be directed towards ISP B (and vice-versa between with roles for ISP A and B reversed); or (ii) if it belongs to a private prefix (e.g., u1), in which case, it is rewritten to a public address for ISP A or B, depending on policy.

FIG. 3 illustrates an example of processing packets with stateful mappings. For example, certain embodiments use stateful mappings when the pool is a /96 pool. Certain embodiments use stateful mappings when the pool is a /64 pool with checksum neutral 16 bits.

A packet is received at step 302 and forwarded at step 304. At step 306, a determination is made whether to send the packet to uplinks. In response to determining in step 306 not to send the packet to uplinks, the packet is transmitted on an interface, as shown in step 308. In response to determining in step 306 to send the packet to uplinks, an uplink is selected based on an uplink selection policy (e.g., uplink selection policy 208), as shown in step 310. At step 312, a determination is made whether the source address of the packet is valid on the selected uplink. Certain embodiments determine whether the source address of the packet is valid based on a table (illustrated as uplinks valid prefixes table 314). In response to determining at step 312 that the source address is valid on the selected uplink, the source address is kept (without re-writing) (step 316) and the packet is transmitted (step 330). In response to determining at step 412 that the source address is not valid on the selected uplink, the source address is re-written (further discussed below beginning with step 318) and, assuming that anew address can be selected successfully, the packet is transmitted (step 330).

The source address re-writing steps in the example embodiment of FIG. 3 begin with step 318, which determines if there is an existing address mapping for the source address. Certain embodiments determine if there is an existing address mapping based on a table (illustrated as uplink address mapping table 320). In response to determining at step 318 that there is an existing address mapping for the source address, method 300 proceeds to step 322 to re-use the same mapped address (i.e., re-write the source address of the packet using the existing address mapping) and then to step 330 to transmit the packet. In response to determining at step 318 that there is not an existing address mapping for the source address, method 300 proceeds to step 324 to generate a first pseudo-random mapping. The first pseudo-random mapping indicates an address that is a candidate for re-writing the source address of the packet.

Method 300 proceeds to step 326 with determining, for example, based on a mapping table (e.g., uplink address mapping table 320), whether the first pseudo-random mapping determined in step 324 causes a collision indicating that the candidate address has already been otherwise mapped. In response to determining at step 326 that there is no collision, method 300 proceeds to step 328 with using the candidate address. Thus, the source address of the packet may be re-written based on the candidate address of the first pseudo-random mapping. The first pseudo-random mapping may be stored (e.g., using uplink address mapping table 320) and the packet may be transmitted, as shown in step 330.

Alternatively, in response to determining at step 326 that there is a collision, method 300 proceeds to step 332 with generating a second pseudo-random mapping. The second pseudo-random mapping indicates another address that is a candidate for re-writing the source address of the packet. The candidate address of the second pseudo-random mapping is different than the candidate address of the first pseudo-random mapping. Method 300 proceeds to step 334 with determining, for example, based on a mapping table (e.g., uplink address mapping table 320), whether the second pseudo-random mapping determined in step 332 causes a collision indicating that the candidate address has already been otherwise mapped. In response to determining at step 334 that there is no collision, method 300 proceeds to step 328 with using the candidate address. Thus, the source address of the packet may be re-written based on the candidate address of the second pseudo-random mapping. The second pseudo-random mapping may be stored (e.g., using uplink address mapping table 320) and the packet may be transmitted, as shown in step 330. Otherwise, if at step 334 a determination is made that the second pseudo-random mapping results in a collision, method 300 proceeds to step 336 where the packet received in step 302 is dropped and an error logged.

FIG. 4 illustrates an example of processing packets with stateless mappings. Certain embodiments use stateless mappings when the pool is a /64 pool. A packet is received at step 402 and forwarded at step 404. At step 406, a determination is made whether to send the packet to uplinks. In response to determining in step 406 not to send the packet to uplinks, the packet is transmitted on an interface, as shown in step 408. In response to determining in step 406 to send the packet to uplinks, an uplink is selected based on an uplink selection policy (e.g., uplink selection policy 208), as shown in step 410. At step 412, a determination is made whether the source address of the packet is valid on the selected uplink. Certain embodiments determine whether the source address of the packet is valid based on a table (illustrated as uplinks valid prefixes table 414). In response to determining at step 412 that the source address is valid on the selected uplink, the source address is kept (without re-writing) (step 416) and the packet is transmitted (step 420). In response to determining at step 412 that the source address is not valid on the selected uplink, the source address is re-written (step 418) and the packet is transmitted (step 420). For example, the source address may be re-written based on generating a pseudo-random mapping.

Figure 5:
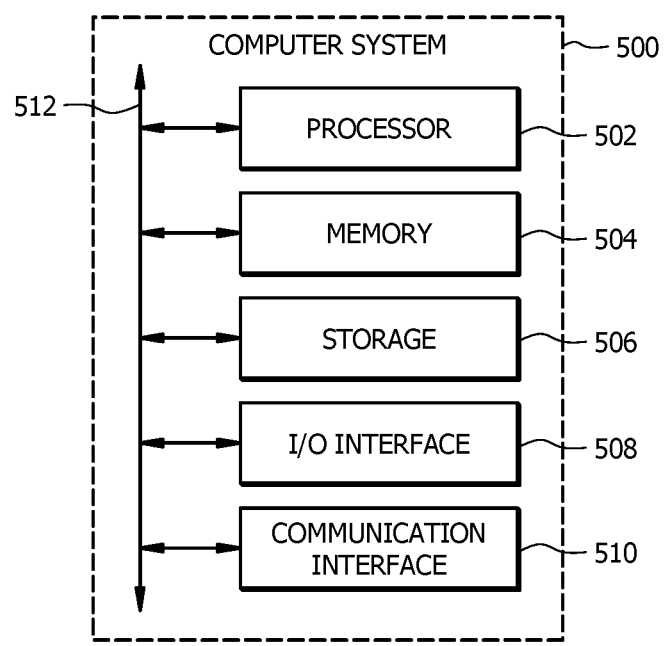
FIG. 5 illustrates an example of a computer system, in accordance with certain embodiments.

Reference is now made to FIG. 5, wherein is shown an example computer system 500 which may be used by the systems and methods described herein. As an example, a computers system 500 may be used to implement a device 203, a border router 206, or other component of a network 200 shown in FIG. 2. In particular embodiments, one or more computer systems 500 perform one or more steps of one or more methods described or illustrated herein, such as method 100 described with respect to FIG. 1, method 300 described with respect to FIG. 3, or method 400 described with respect to FIG. 4. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Certain embodiments may provide certain advantages compared to existing approaches. For example, certain existing approaches acknowledge that the problem of address exhaustion in IPv4 has been exacerbated by factors such as deployment of Internet-of-Things (IoT) solutions, and that IPv6 increases the size of the address pool. However, the existing approaches do not provide a solution for efficiently implementing IPv6 in enterprise networks. For example, certain existing solutions, including most SD-WAN IPv6 solutions, rely on a private internal addressing space based on NAT, which sacrifices the end-to-end principle. Other existing solutions use source-based routing and do not enable uplink selection policies to be installed. The existing solutions, however, fail to describe a way to expose globally unique addresses to end-users while also enabling custom policies to be installed. By contrast, embodiments of the present disclosure provide a way to preserve end-to-end IPv6 connectivity (without address rewrite) while also enabling SD-WAN uplink selection policies to be applied.

Certain embodiments facilitate using different addressing techniques for different packets, depending on various factors. For example, one or more of the following techniques may be available: generating a list of prefixes and acting in a certain way depending on whether the source address belongs to this list of prefixes; constructing the uplink lists of prefixes in an automated fashion based on prefixes received from the ISP; dynamically reserving part of the ISP prefix as mapping allocation space; addressing the network using the rest of the ISP allocated space; for each packet transmitted on an uplink, checking if the packet needs rewrite; performing hashing based address mapping to ensure address mapping stability; when a /64 is used, perform the NAT function in a stateless way; and/or using checksum-neutral mappings.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components (such as a manager, controller, services engine, access point, wireless device, etc.) described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A system, the system comprising:
one or more processors; and
one or more computer-readable non-transitory storage media comprising instructions that, when executed by the one or more processors, cause one or more components of the system to perform operations comprising:
receiving a packet comprising a source address;
selecting an uplink for the packet, the uplink selected from a plurality of uplinks based on an uplink selection policy;
determining whether the source address is valid on the selected uplink;
determining whether to keep or re-write the source address based on whether the source address is valid on the selected uplink, wherein, in response to determining to re-write the source address, selecting a new address from an address pool;
keeping the source address when the source address is valid on the selected uplink or re-writing the source address when the source address is not valid on the selected uplink; and
sending the packet to the selected uplink.

2. The system of claim 1, wherein determining whether the source address is valid on the selected uplink is based on whether a prefix of the source address corresponds to a prefix associated with the selected uplink.

3. The system of claim 1, wherein the uplink selection policy indicates to select a first uplink for which the source address is valid unless a condition occurs indicating to select a second uplink for which the source address is not valid.

4. The system of claim 3, wherein the uplink selection policy comprises at least one of the following conditions for selecting the second uplink:
the first uplink is down;
the first uplink does not appear to provide network access;
the packet comprises a type of traffic configured to be sent via the second uplink;
load-balancing indicates to send the packet via the second uplink; or
the source address is in a unique local address (ULA) prefix that is not valid on the first uplink.

5. The system of claim 1, wherein selecting a new address from an address pool is based at least in part on a hash function.

6. The system of claim 1, wherein selecting a new address from an address pool is based at least in part on a stateless function.

7. The system of claim 1, wherein selecting a new address from an address pool is based at least in part on a stateful function.

8. The system of claim 1, the operations further comprising:
receiving a list of prefixes from a service provider associated with at least one of the plurality of uplinks; and
reserving a portion of the prefixes for re-writing addresses.

9. A method, the method comprising:
receiving a packet comprising a source address;
selecting an uplink for the packet, the uplink selected from a plurality of uplinks based on an uplink selection policy;
determining whether the source address is valid on the selected uplink;
determining whether to keep or re-write the source address based on whether the source address is valid on the selected uplink, wherein, in response to determining to re-write the source address, selecting a new address from an address pool;
keeping the source address when the source address is valid on the selected uplink or re-writing the source address when the source address is not valid on the selected uplink; and
sending the packet to the selected uplink.

10. The method of claim 9, wherein determining whether the source address is valid on the selected uplink is based on whether a prefix of the source address corresponds to a prefix associated with the selected uplink.

11. The method of claim 9, wherein the uplink selection policy indicates to select a first uplink for which the source address is valid unless a condition occurs indicating to select a second uplink for which the source address is not valid.

12. The method of claim 11, wherein the uplink selection policy comprises at least one of the following conditions for selecting the second uplink:
the first uplink is down;
the first uplink does not appear to provide network access;
the packet comprises a type of traffic configured to be sent via the second uplink;
load-balancing indicates to send the packet via the second uplink; or
the source address is in a unique local address (ULA) prefix that is not valid on the first uplink.

13. One or more computer-readable non-transitory storage media embodying instructions that, when executed by a processor, cause the performance of operations comprising:
receiving a packet comprising a source address;
selecting an uplink for the packet, the uplink selected from a plurality of uplinks based on an uplink selection policy;
determining whether the source address is valid on the selected uplink;
determining whether to keep or re-write the source address based on whether the source address is valid on the selected uplink, wherein, in response to determining to re-write the source address, selecting a new address from an address pool;
keeping the source address when the source address is valid on the selected uplink or re-writing the source address when the source address is not valid on the selected uplink; and
sending the packet to the selected uplink.

14. The one or more computer-readable non-transitory storage media of claim 13, wherein determining whether the source address is valid on the selected uplink is based on whether a prefix of the source address corresponds to a prefix associated with the selected uplink.

15. The one or more computer-readable non-transitory storage media of claim 13, wherein the uplink selection policy indicates to select a first uplink for which the source address is valid unless a condition occurs indicating to select a second uplink for which the source address is not valid.

16. The one or more computer-readable non-transitory storage media of claim 15, wherein the uplink selection policy comprises at least one of the following conditions for selecting the second uplink:
 the first uplink is down;
 the first uplink does not appear to provide network access;
 the packet comprises a type of traffic configured to be sent via the second uplink;
 load-balancing indicates to send the packet via the second uplink; or
 the source address is in a unique local address (ULA) prefix that is not valid on the first uplink.

17. The one or more computer-readable non-transitory storage media of claim 13, wherein, selecting a new address from an address pool is based at least in part on a hash function.

18. The one or more computer-readable non-transitory storage media of claim 13, wherein selecting a new address from an address pool is based at least in part on a stateless function.

19. The one or more computer-readable non-transitory storage media of claim 13, wherein selecting a new address from an address pool is based at least in part on a stateful function.

20. The one or more computer-readable non-transitory storage media of claim 13, the operations further comprising:
 receiving a list of prefixes from a service provider associated with at least one of the plurality of uplinks; and
 reserving a portion of the prefixes for re-writing addresses.

* * * * *